No. 856,757. PATENTED JUNE 11, 1907.
J. R. BARKER.
AUTOMOBILE WHEEL.
APPLICATION FILED OCT. 29, 1906.

WITNESSES:
W. F. Doyle
Geo. B. Wood

INVENTOR
James R. Barker
BY Wm. H. Bates
Attorney

UNITED STATES PATENT OFFICE.

JAMES R. BARKER, OF GREEN VALLEY, ILLINOIS.

AUTOMOBILE-WHEEL.

No. 856,757.  Specification of Letters Patent.  Patented June 11, 1907.

Application filed October 29, 1906. Serial No. 341,036.

*To all whom it may concern:*

Be it known that I, JAMES R. BARKER, a citizen of the United States, residing at Green Valley, in the county of Tazewell and State of Illinois, have invented certain new and useful Improvements in Automobile-Wheels, of which the following is a specification, My invention relates to improvements in wheels for automobiles and like vehicles, and the object of the invention is to provide a multiplicity of circular flat springs in lieu of spokes for the wheel. And the object of the invention is to combine simplicity of construction, and operation of the parts, and with these ends in view the invention consists in the novel construction and arrangement of parts, as will be hereinafter more in detail described, and particularly pointed out in the claims.

I have fully and clearly illustrated my invention in the accompanying drawings in which—

Figure 1:
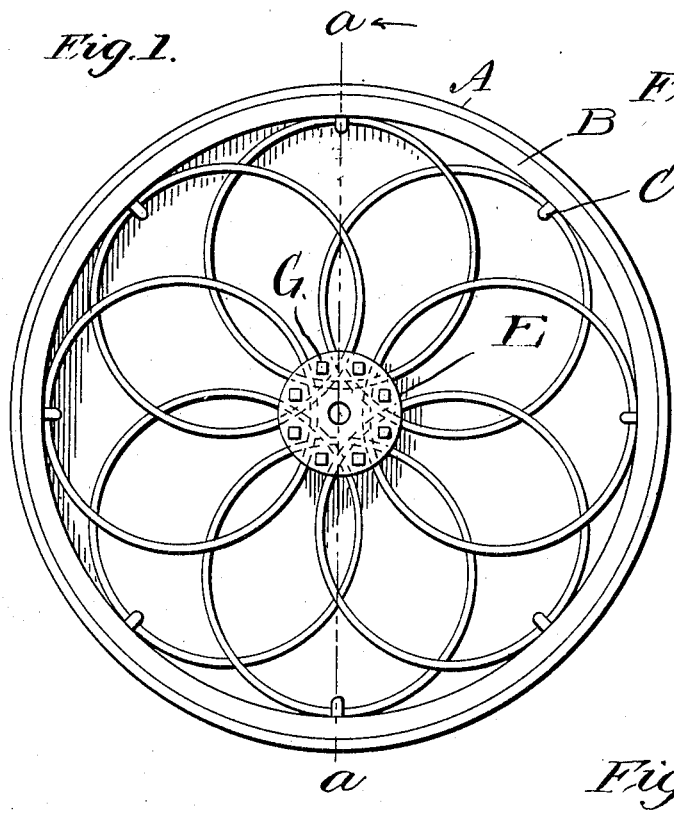
Figure 2:
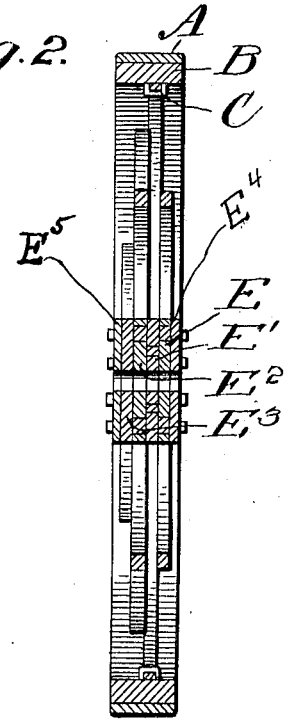
Figure 3:
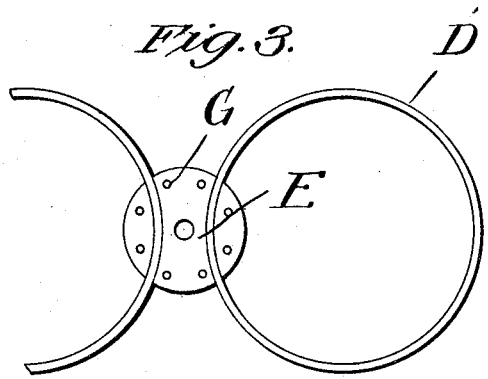
Figure 4:
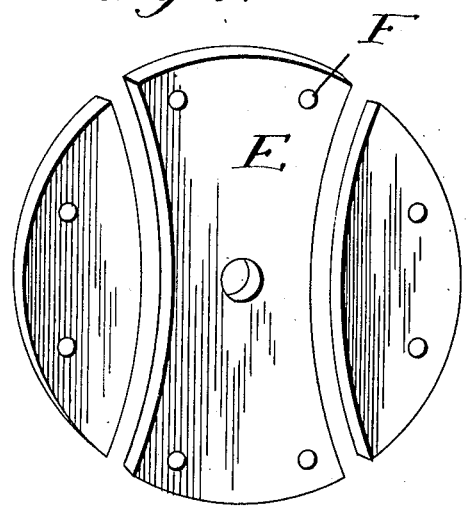

Figure 1 is a front elevation of a wheel complete. Fig. 2 is a transverse sectional view thereof on the line a, a, of Fig. 1, and Fig. 3 is a detailed view of one of the inner disks or hubs, showing the springs, in their proper and relative positions, and Fig. 4 is an enlarged view of one of the inner disks in sections to receive the springs.

A designates a tire which is formed of metal.

B designates an inner wooden felly secured to the inner face of A and having secured upon its inner face a series of staples C, these staples being arranged at predetermined distances apart and which engage at their outer portions a multiple number of flat springs D, which will be hereinafter more fully described, in connection with the disks or hubs to which their inner portions are secured and peculiarly arranged.

E, E¹, E², E³, E⁴, E⁵ designate disks forming the hubs of the wheel, the two outer of which are complete rings and the four inner ones formed in sections, the sectional or inner disks being secured to the outer ones and all of which are mounted upon an axle (not shown in the drawings).

F designates perforations formed in the sectional disks at equal distances apart near the periphery thereof, the larger and central section having four, and the others and smaller sections two each, in which are securely inserted a number of studs G, through the medium of which the inner portions of the rings D are interwoven and securely but loosely locked to the disks or hubs. The inner portions of these rings take in grooves formed by the sectional inner hubs or disks and are crossed and lie in a plane at right angles and crossing each other upon the inner disks between the circular series of studs G, the rings overlapping each other. The outer portions of the rings are connected to the felly by staples, which are loose enough to allow the springs to be turned. These staples keep the rings in place between the disks and allow of free play of the rings during the running of the wheels the resiliency of the springs giving the requisite amount of motion to the said wheels.

A spring-ring may be adjusted by loosening the disks at the hub and turning the ring as much as may be necessary so that a weakened portion may be put at the hub, where it will be subjected to little strain. The operative mechanism of the wheels is all contained within the circumference of the felly. If it should be desired to replace the metallic tire by a cushion tire, the former can be readily taken off and the latter substituted.

Having thus described my invention what I claim is:

An automobile wheel consisting of a metallic tire, a wooden felly upon which the tire is secured, staples secured at predetermined distances apart to the inner face of the wooden felly, the outer portion of circular springs passed through said staples, solid disks E⁴, E⁵ and sectional disks E E¹, E², E³ provided with grooved openings to receive the inner portions of the flat circular springs and studs projected through the disks.

In testimony whereof I have signed my name to this specification in the presence of two subscribing witnesses.

JAMES R. BARKER.

Witnesses:
JESSE B. TROWBRIDGE,
GEORGE NEWELL.